(12) United States Patent
Sakamoto

(10) Patent No.: US 7,380,763 B2
(45) Date of Patent: Jun. 3, 2008

(54) SEAT HEIGHT ADJUSTING DEVICE

(75) Inventor: Yutaka Sakamoto, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 214 days.

(21) Appl. No.: 11/322,376

(22) Filed: Jan. 3, 2006

(65) Prior Publication Data

US 2006/0145521 A1    Jul. 6, 2006

(30) Foreign Application Priority Data

Jan. 4, 2005    (JP) .............................. 2005-000034

(51) Int. Cl.
*F16M 13/00*    (2006.01)
(52) U.S. Cl. ................. 248/422; 248/419; 297/373
(58) Field of Classification Search ................ 248/422, 248/419, 421; 297/373, 94, 99, 354.12
See application file for complete search history.

(56) References Cited

U.S. PATENT DOCUMENTS 5,007,611 A * 4/1991 Kanai .......................... 248/422
5,322,341 A * 6/1994 Harrison et al. ............... 297/94
6,290,198 B1   9/2001 Kojima et al.
6,719,372 B2 * 4/2004 Glaspie et al. ............... 297/373
7,040,711 B2 * 5/2006 DeKraker et al. ........ 297/463.1

FOREIGN PATENT DOCUMENTS

DE    44 46 741    6/1996
JP    10-35332     2/1998

* cited by examiner

*Primary Examiner*—Amy J. Sterling
(74) *Attorney, Agent, or Firm*—Wenderoth, Lind & Ponack, L.L.P.

(57) ABSTRACT

A seat height adjusting device includes first and second brackets spaced away from each other, an arm disposed between the first and second brackets and having first and second ends pivotally mounted on the first bracket and a seat support, a spur gear operable to rotate the arm, first and second latches engageable with the spur gear, and a handle rotatably mounted on the first or second bracket. One of the first and second brackets is joined to a seat frame. When the seat is raised, the handle is operated to intermittently engage the first latch with the spur gear, thereby rotating the spur gear in a first direction to drive the arm. To lower the seat, the handle is operated to intermittently engage the second latch with the spur gear, thereby rotating the spur gear in a direction opposite the first direction to drive the arm.

6 Claims, 11 Drawing Sheets

SEAT HEIGHT ADJUSTING DEVICE

BACKGROUND OF THE INVENTION

1. Field of the Invention

The present invention relates to a device for appropriately adjusting the height of a seat such as, for example, an automobile seat.

2. Description of the Related Art

A conventional height adjusting device for an automobile seat is disposed between an upper rail, which constitutes a seat sliding apparatus, and a seat cushion, and includes a small-diameter pinion mounted on an operating shaft, a large-diameter sector gear held in engagement with the pinion, and an operating lever mounted on the sector gear. In an attempt to adjust the height of the seat, the operating lever is operated up and down to rotate the pinion via the sector gear (see, for example, Patent Document 1).

This height adjusting device also includes a brake drum for preventing a vertical movement of a lifting mechanism. Even if the operating lever is operated, no brakes are applied to the lifting mechanism, but if a load is applied from the seat cushion side, the brake drum applies the brakes to the lifting mechanism.

Patent Document 1: Japanese Laid-Open Patent Publication No. 10-35332 (see FIG. 1)

However, the brake drum employed in the height adjusting device as disclosed in Patent Document 1 is of a friction type, and there is still room for improvement in terms of the operational feel. Also, the seat stiffness is not so high.

SUMMARY OF THE INVENTION

The present invention has been developed to overcome the above-described disadvantages.

It is accordingly an objective of the present invention to provide a seat height adjusting device that can improve the operational feel, enhance the seat stiffness, and allow fine adjustments by employing a mechanical lock.

In accomplishing the above and other objectives, the seat height adjusting device according to the present invention is mounted on at least one of a front end portion and a rear end portion of a seat that has a seat frame and is supported by a seat support, the seat height adjusting device including a first bracket and a second bracket spaced away from each other, an arm disposed between the first and second brackets and having one end pivotally mounted on the first bracket and the other end pivotally mounted on the seat support, a spur gear operable to rotate the arm, a first latch and a second latch both engageable with the spur gear, and a handle rotatably mounted on one of the first and second brackets. One of the first and second brackets is joined to the seat frame. When the seat is raised, the handle is operated to intermittently engage the first latch with the spur gear, thereby rotating the spur gear in a first direction to drive the arm. On the other hand, when the seat is lowered, the handle is operated to intermittently engage the second latch with the spur gear, thereby rotating the spur gear in a second direction counter to the first direction to drive the arm.

By this construction, the seat height adjusting device can be mechanically locked, making it possible to enhance the seat stiffness and improve the operational feel.

The seat height adjusting device further includes a worm rotatably disposed between the first and second brackets, a first helical gear secured to the arm and held in engagement with the worm, and a second helical gear joined to the spur gear and held in engagement with the first helical gear, wherein the arm is driven via the first and second helical gears by rotating the spur gear.

This construction allows substantially stepless fine adjustments of the seat height.

The worm and the first helical gear have a lead angle greater than an angle of friction.

The seat height adjusting device also includes a lock member, wherein the worm has a number of notches defined therein so as to be engageable with the lock member, the lock member being operable to lock the worm or release the worm from being locked.

One of the first and second brackets has a latch driving portion to drive the first and second latches, wherein when the spur gear rotates in the first direction, the latch driving portion is operable to release engagement between the second latch and the spur gear, while when the spur gear rotates in the second direction, the latch driving portion is operable to release engagement between the first latch and the spur gear.

The seat height adjusting device also includes a handle holder on which the handle and the first and second latches are rotatably mounted, wherein the handle is operated to rotate the handle holder within a predetermined range of angle, thereby intermittently engaging the first and second latches with the spur gear.

The seat height adjusting device further includes a kick plate rotatably mounted on the handle holder, wherein the handle is operated to rotate the lock member via the kick plate, thereby locking the worm or releasing the worm from being locked.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

This application is based on an application No. 2005-000034 filed Jan. 4, 2005 in Japan, the content of which is herein expressly incorporated by reference in its entirety.

A preferred embodiment of the present invention is explained hereinafter with reference to the drawings.

Figure 1:
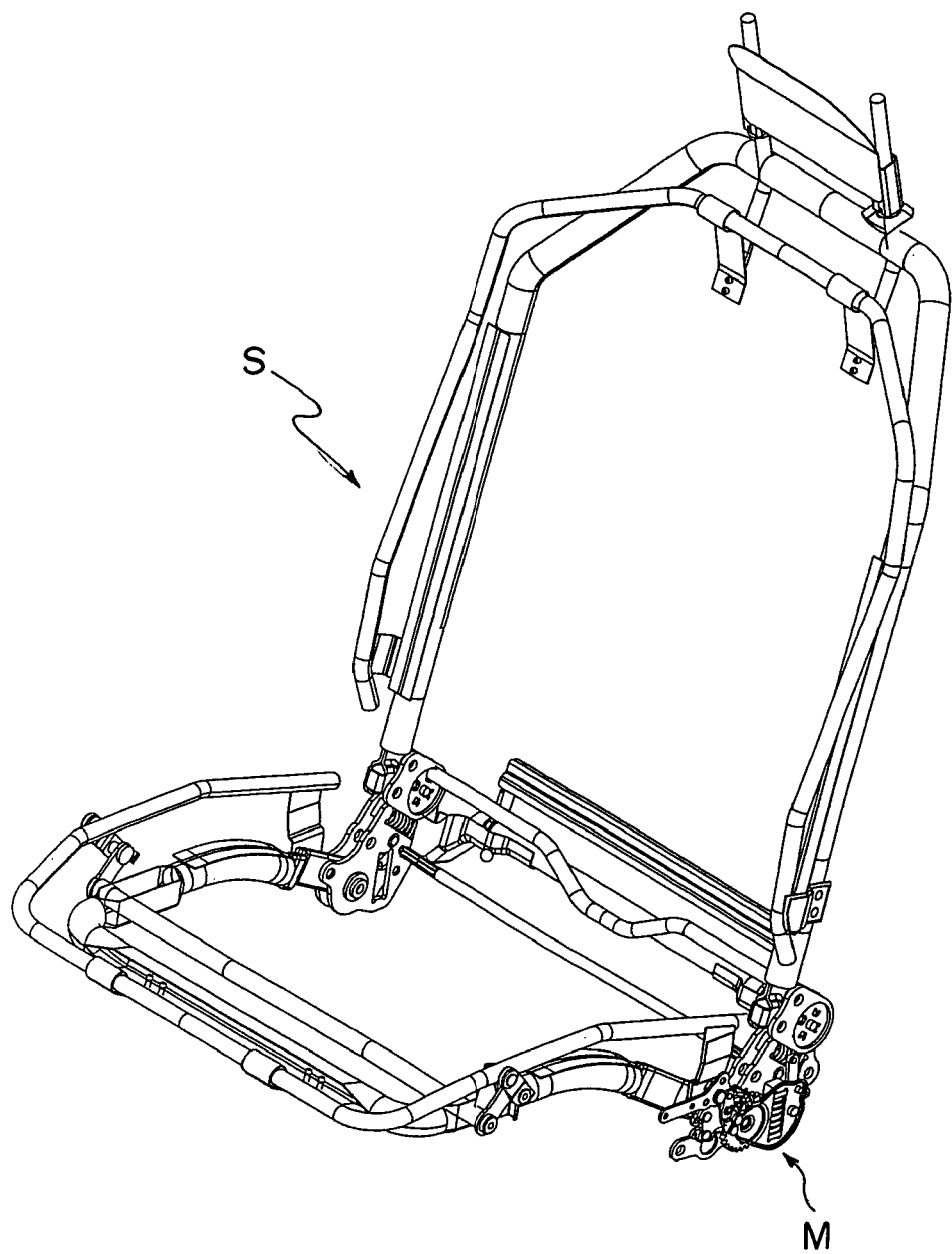
FIG. 1 is a perspective view of a seat frame provided with a seat height adjusting device according to the present invention.
Figure 2:
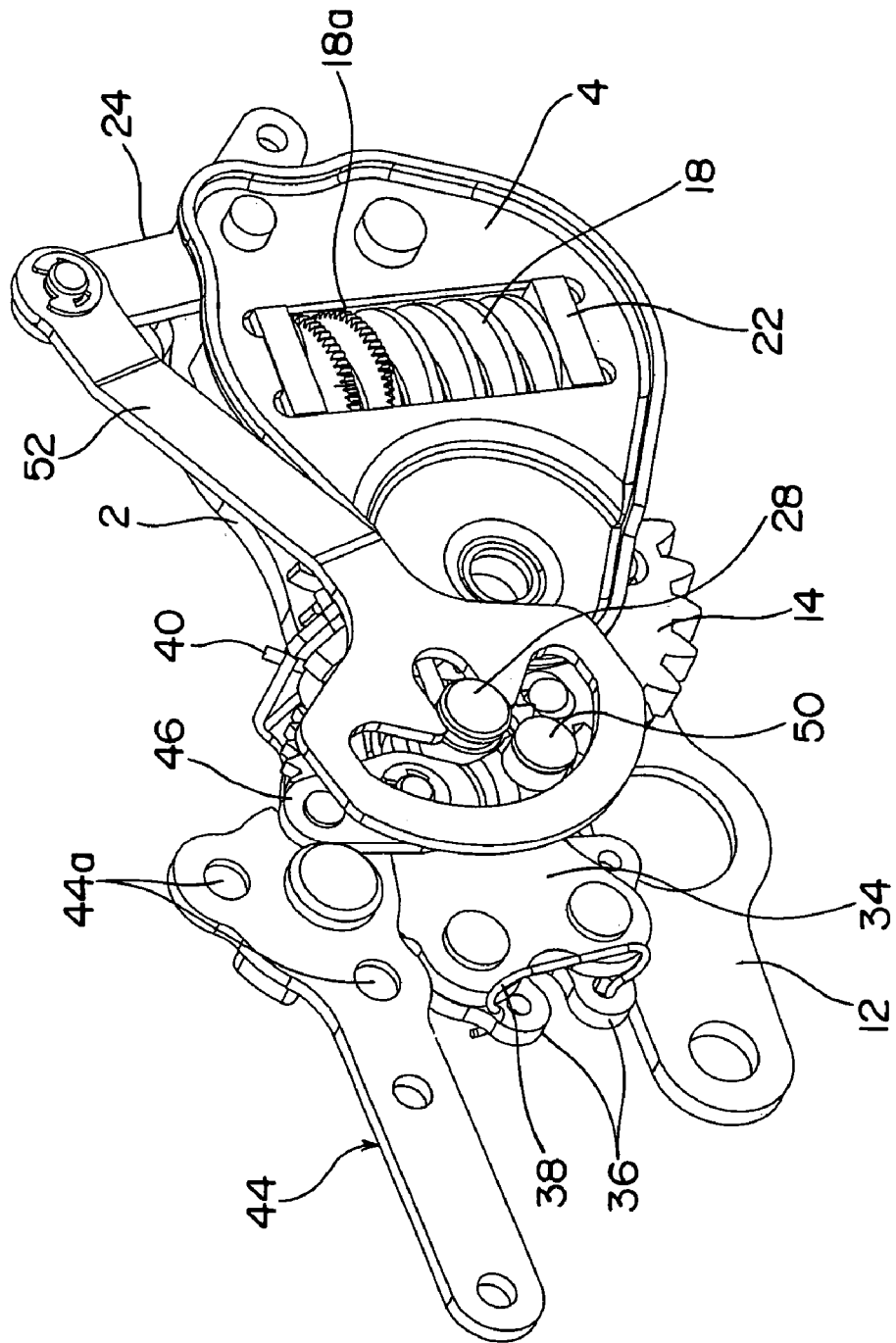
FIG. 2 is a perspective view of the seat height adjusting device according to the present invention.
Figure 3:
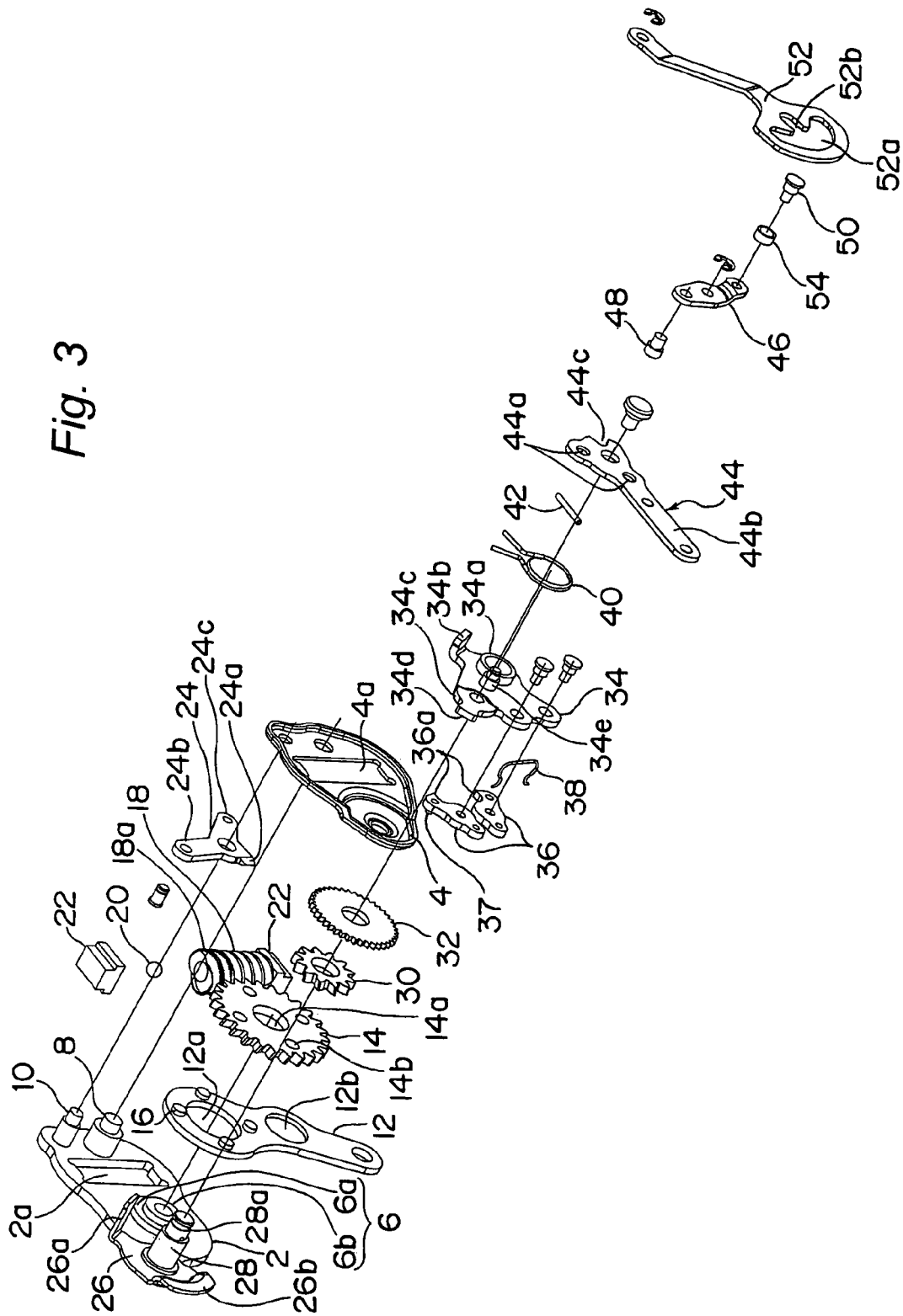
FIG. 3 is an exploded perspective view of the seat height adjusting device of FIG. 2.
Figure 4:
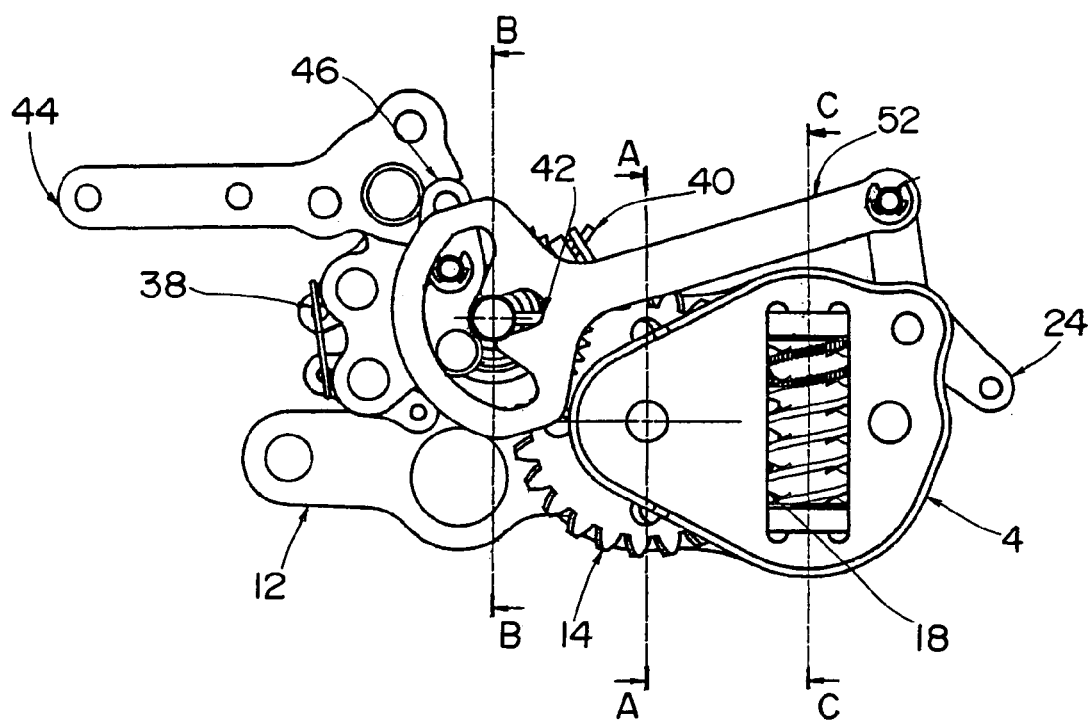
FIG. 4 is a front view of the seat height adjusting device of FIG. 2.
Figure 5:
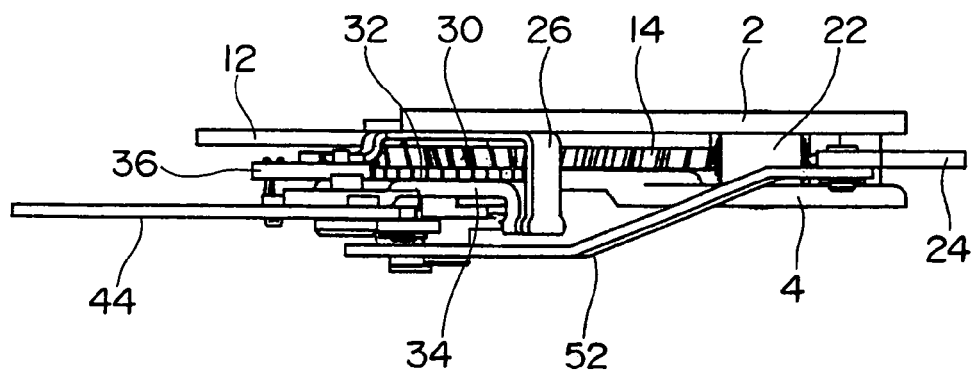
FIG. 5 is a top plan view of the seat height adjusting device of FIG. 2.
Figure 6:
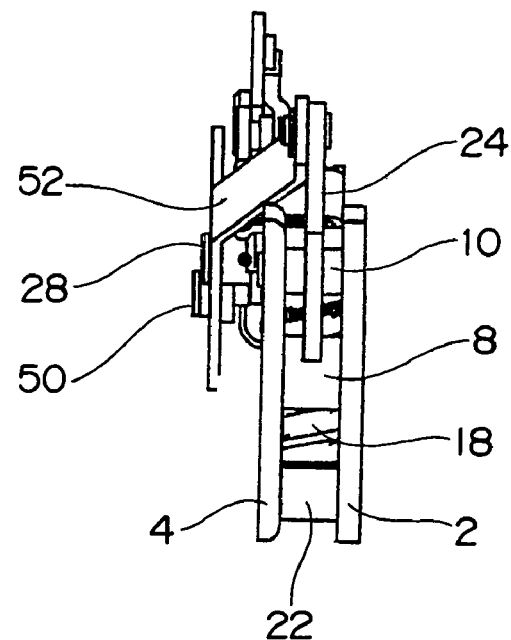
FIG. 6 is a side view of the seat height adjusting device of FIG. 2.
Figure 7:
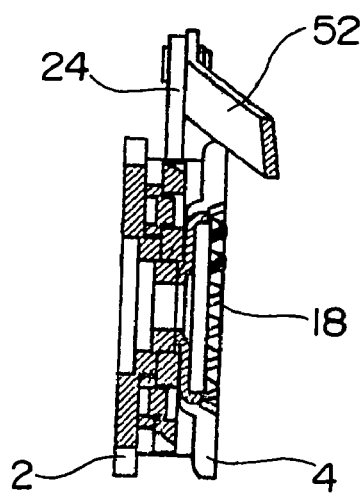
FIG. 7 is a sectional view taken along the line A-A in FIG. 4.
Figure 8:
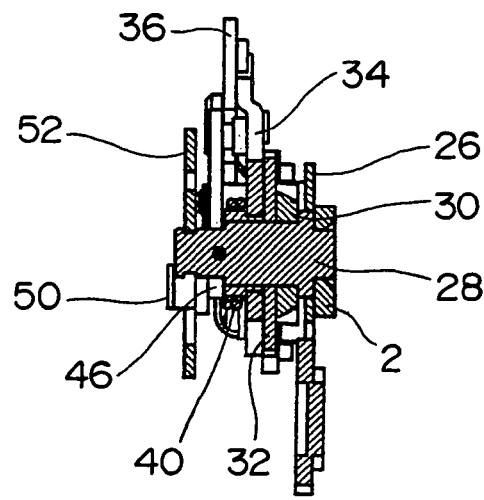
FIG. 8 is a sectional view taken along the line B-B in FIG. 4.
Figure 9:
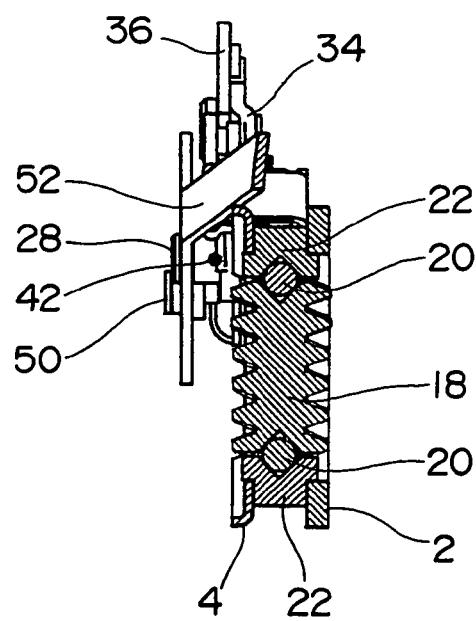
FIG. 9 is a sectional view taken along the line C-C in FIG. 4.

FIG. 1 depicts a seat frame S provided with a seat height adjusting device M according to the present invention, which is mounted on a rear end portion of the seat frame S on one side thereof (the right-hand side in FIG. 1).

As shown in FIGS. 2 to 9, the seat height adjusting device M includes first and second brackets 2, 4 held in a spaced relationship by first, second and third pins 6, 8, 10. The first pin 6 has a large-diameter portion 6a and a small-diameter portion 6b. One end of an arm 12 is pivotally mounted on the large-diameter portion 6a of the first pin 6, while a first helical gear 14 is rotatably mounted on the small-diameter portion 6b of the first pin 6. The arm 12 has a round hole 12a defined therein at the one end thereof, in which the large-diameter portion 6a of the first pin 6 is loosely inserted, and a plurality of (for example, four) equally spaced pins 16 unitarily formed therewith or otherwise rigidly secured thereto around the round hole 12a so as to protrude towards the first helical gear 14. The first helical gear 14 has a round central hole 14a defined therein, in which the small-diameter portion 6b of the first pin 6 is loosely inserted, and a plurality of equally spaced pin insertion holes 14b defined therein around the central hole 14a, in which pin insertion holes 14b the pins 16 of the arm 12 are inserted, so that the arm 12 and the first helical gear 14 may be rotatably held together.

The first helical gear 14 is held in engagement with a worm 18, which is in turn rotatably supported at opposite ends thereof by a pair of worm supports 22. Each worm support 22 accommodates a ball 20 and is held by the two brackets 2, 4. The worm 18 has a number of equally spaced notches 18a defined therein at one end portion thereof so as to confront a lock portion 24a of a lock member 24 that is rotatably mounted on the third pin 10. Each of the two brackets 2, 4 has a generally rectangular worm insertion opening 2a, 4a defined therein, in which the worm 18 is partly inserted for reduction of the distance between the two brackets 2, 4.

The first helical gear 14 and the worm 18 held in engagement with each other have a lead angle greater than the angle of friction so that when the first helical gear 14 rotates, the worm 18 also rotates together with the first helical gear 14.

A third bracket 26 is mounted on the first bracket 2, and a pin 28 is secured to the third bracket 26 so as to protrude towards the second bracket 4. A second helical gear 30 and a spur gear 32 are rigidly secured to each other and rotatably mounted on the pin 28. The second helical gear 30 is held in engagement with the first helical gear 14 and has a diameter less than that of the first helical gear 14. A handle holder 34 is rotatably mounted on the pin 28 and has one end portion on which a pair of latches 36 are rotatably mounted. Each latch 36 has a claw 36a formed at one end thereof so as to be engageable with the spur gear 32, and also has a pin 37 secured thereto or otherwise unitarily formed therewith at a location adjacent to the claw 36a. The third bracket 26 has a spring retainer 26a unitarily formed therewith and a stepped portion 26b formed therewith at a location remote from the spring retainer 26a. This stepped portion 26b is employed as a latch driving portion to drive the pair of latches 36, as explained later. The pin 37 of the latch 36 is held in contact with an outer edge of the stepped portion 26b of the third bracket 26. A generally U-shaped spring 38 is connected at opposite ends thereof to the other ends of the pair of latches 36 to always bias the pair of latches 36 in a direction in which the claws 36a engage with the spur gear 32.

The handle holder 34 has a round hole defined therein, in which the pin 28 is inserted, and a ring-shaped boss 34a formed therewith around the round hole. A spring 40 is wound around the ring-shaped boss 34a and has opposite ends, one of which is held in contact with a side edge of the spring retainer 26a unitarily formed with the third bracket 26, and the other of which is held in contact with a side edge of a spring retainer 34b unitarily formed with the handle holder 34, thereby positioning the handle holder 34 with respect to the third bracket 26. The pin 28 has a spring pin 42 secured thereto so as to extend in a direction perpendicular to the axial direction of the pin 28. A free end of the spring pin 42 is positioned immediately above the ring-shaped boss 34a to prevent removal of the spring 40 from the ring-shaped boss 34a.

The handle holder 34 also has a handle mounting portion 34c unitarily formed therewith at a side portion thereof between a latch mounting portion and the spring retainer 34b located on opposite sides of the handle holder 34. A handle 44 is rotatably mounted on the handle mounting portion 34c of the handle holder 34. The handle mounting portion 34c has a protrusion 34d unitarily formed therewith so as to extend away from the ring-shaped boss 34a, and the handle 44 has two protrusions 44a formed therewith in proximity to a center of rotation thereof on respective sides of the protrusion 34d.

The handle holder 34 further has a pin 34e secured thereto or otherwise unitarily formed therewith at a location between the ring-shaped boss 34a and the handle mounting portion 34c, and a kick plate 46 is rotatably mounted on the pin 34e. The kick plate 46 has two pins 48, 50 secured thereto at opposite ends thereof so as to protrude away from each other. The handle 44 has a recess 44c defined therein in proximity to the center of rotation thereof and remote from a grip 44b to receive the pin 48 therein or release it therefrom.

A release 52 is disposed outwardly of the kick plate 46 and has an arcuated first guide groove 52a and a second guide groove 52b both defined therein at one end portion thereof with the second guide groove 52b extending from an inner edge of the first guide groove 52a towards the other end portion of the release 52. The pin 50 is inserted in the first guide groove 52a and brought into sliding contact with an outer edge thereof, while a distal end portion of the pin 28 secured to the third bracket 26 is loosely inserted in the second guide groove 52b. Because the pin 50 is brought into sliding contact with the outer edge of the first guide groove 52a, a ring 54 is mounted on the pin 50 at a sliding contact portion thereof. The pin 28 has a ring-shaped groove 28a defined therein at a distal end portion thereof, and a side edge of the second guide groove 52b is received in the ring-shaped groove 28a to thereby slidingly hold one end portion of the release 52 with respect to the pin 28. The release 52 is bent inwardly from the one end portion thereof towards the other end portion thereof, which is in turn pivotally mounted on a protruding portion 24*b* formed with the lock member 24.

The lock member 24 has a spring retaining portion 24*c* unitarily formed therewith to retain one end of a spring (not shown), the other end of which is in turn retained by one of the two brackets 2, 4 so that the lock portion 24*a* of the lock member 24 may be biased at all times in a direction in which it engages with one of the notches 18*a* in the worm 18.

In the case where the seat height adjusting device M of the above-described construction is employed in an automobile seat, the seat height adjusting device M is incorporated into one of a pair of seat sliding apparatuses (not shown), on which the seat is mounted so as to be slidable in the longitudinal direction of the automotive vehicle. Each of the pair of seat sliding apparatuses includes a lower rail secured to a vehicle floor and an upper rail (seat support) slidably mounted on the lower rail. An end of the arm 12 remote from the round hole 12*a* is pivotally mounted on a bracket (not shown) that is joined to one of the two upper rails, and one of the two brackets 2, 4 is joined to a seat cushion frame. When it comes to the other of the two upper rails, only an arm 12 is mounted thereon via a bracket, and this arm 12 is pivotally connected to the seat cushion frame, thereby allowing height adjustments of a rear end portion of the seat.

The operation of the seat height adjusting device M according to the present invention is explained hereinafter with reference to FIGS. 10 to 14.

Figure 10:
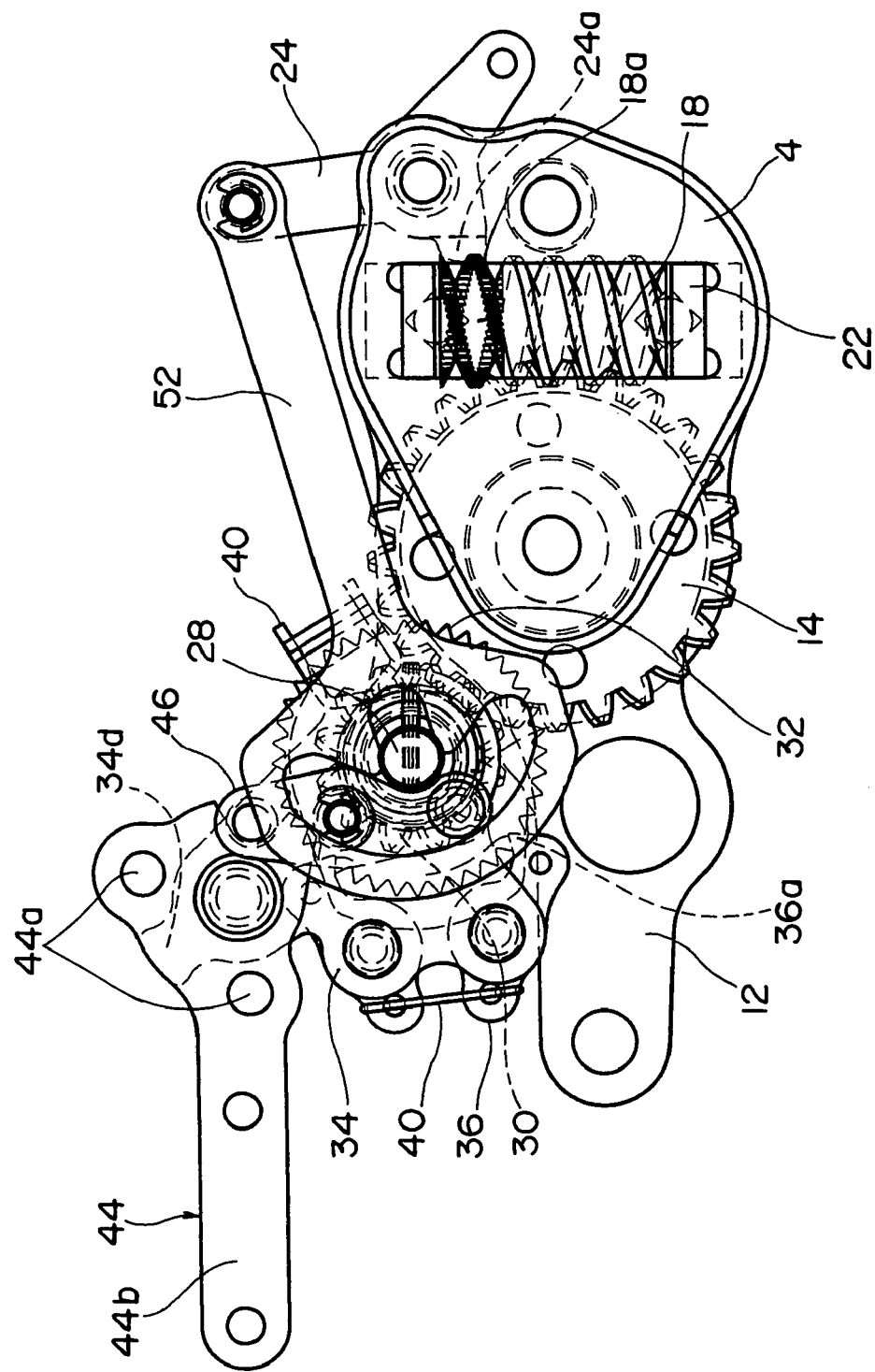
FIG. 10 is a front view of the seat height adjusting device of FIG. 2 when a rear end portion of a seat is in its lowermost position.

FIG. 10 depicts the seat height adjusting device M when the rear end portion of the seat is in its lowermost position. In this condition, the lock portion 24*a* of the lock member 24 engages with one of the notches 18*a* in the worm 18 by the action of an elastic force of the spring, while the claws 36*a* of the pair of latches 36 engage with the spur gear 32 and, hence, the height of the rear end portion of the seat is retained unchanged.

Figure 11:
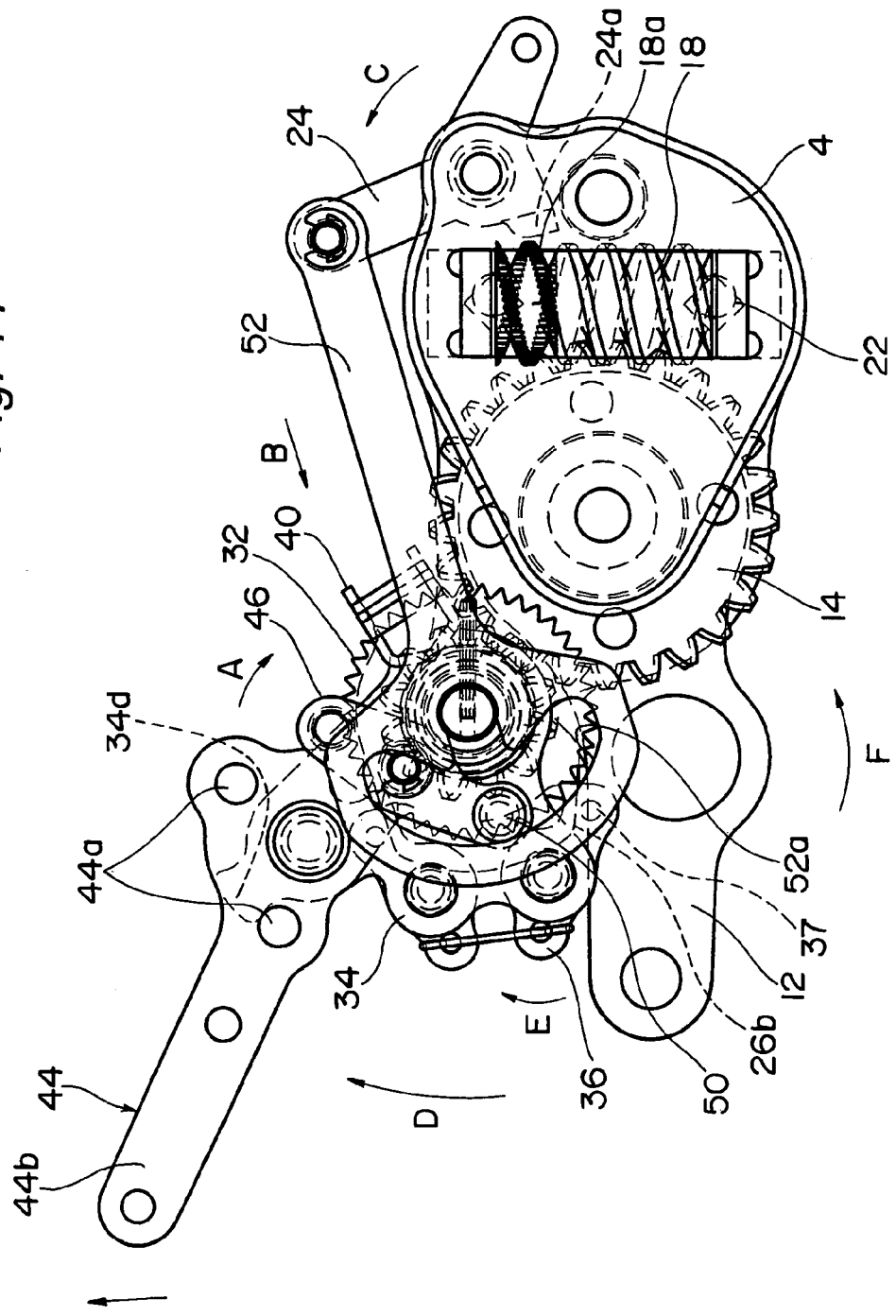
FIG. 11 is a front view of the seat height adjusting device of FIG. 2, particularly depicting an operation to raise the rear end portion of the seat.

In the case where the rear end portion of the seat is raised, when the grip 44*b* of the handle 44 is lifted to a position as shown in FIG. 11, the kick plate 46 rotates in a direction shown by an arrow A to thereby cause the pin 50 received in the first guide groove 52*a* in the release 52 to move the release 52 in a direction shown by an arrow B. As a result, the lock member 24 rotates in a direction shown by an arrow C, and the engagement between the lock portion 24*a* of the lock member 24 and the notch 18*a* in the worm 18 is released.

In such condition, the protrusion 44*a* on the side of the grip 44*b* of the handle 44 is held in contact with a side edge of the protrusion 34*d* of the handle holder 34. Accordingly, when the handle 44 is further lifted from this condition, the handle holder 34 rotates within a predetermined range of angle together with the handle 44. Further, the pair of latches 36 rotate in a direction shown by an arrow D together with the handle holder 34, and the pin 37 secured to the lower latch 36 slides along an outer edge of the stepped portion 26*b* of the third bracket 26, thereby rotating the lower latch 36 in a direction shown by an arrow E. As a result, the engagement between the lower latch 36 and the spur gear 32 is released, but the upper latch 36 is still held in engagement with the spur gear 32 and, hence, the spur gear 32 similarly rotates in the direction of the arrow A. Accordingly, the arm 12 is driven to rotate a predetermined angle in a direction shown by an arrow F via the first and second helical gears 14, 30 held in engagement with each other, thus raising the rear end portion of the seat by a predetermined height or vertical length corresponding to the aforementioned predetermined angle. Because the first helical gear 14 and the worm 18 held in engagement with each other have a lead angle greater than the angle of friction, as explained hereinabove, the worm 18 rotates with the rotation of the first helical gear 14.

In this condition, when the handle 44 is released, the handle holder 34 returns to a position (hereinafter referred to as a neutral position) where the spring retainer 34*b* overlaps with the spring retainer 26*a* of the third bracket 26 by the action of an elastic force of the spring 40, and the lock portion 24*a* of the lock member 24 engages with one of the notches 18*a* in the worm 18 again by the action of an elastic force of the spring (not shown), thereby locking the worm 18.

It is to be noted here that the claw 36*a* of the upper latch 36 is so shaped that when it pushes a tooth flank of the spur gear 32 in the direction of the arrow A, the engagement of the claw 36*a* with the spur gear 32 is maintained, but in a case contrary thereto, the engagement of the claw 36*a* with the spur gear 32 is released against the elastic force of the spring 40.

Accordingly, when the handle 44 returns to its original position (hereinafter referred to as an intermediate position) as shown in FIG. 10, the spur gear 32 engages with the pair of latches 36 again while maintaining the condition in which the spur gear 32 has rotated the predetermined angle and, hence, the rear end portion of the seat can be further raised by a predetermined height by lifting the handle 44 again.

That is, by moving the handle 44 up and down between the intermediate position and the uppermost position, the lock member 24 and the worm 18 engage with or disengage from each other, while the upper latch 36 engages intermittently with the spur gear 32, making it possible to raise the rear end portion of the seat up to a desired height.

Figure 12:
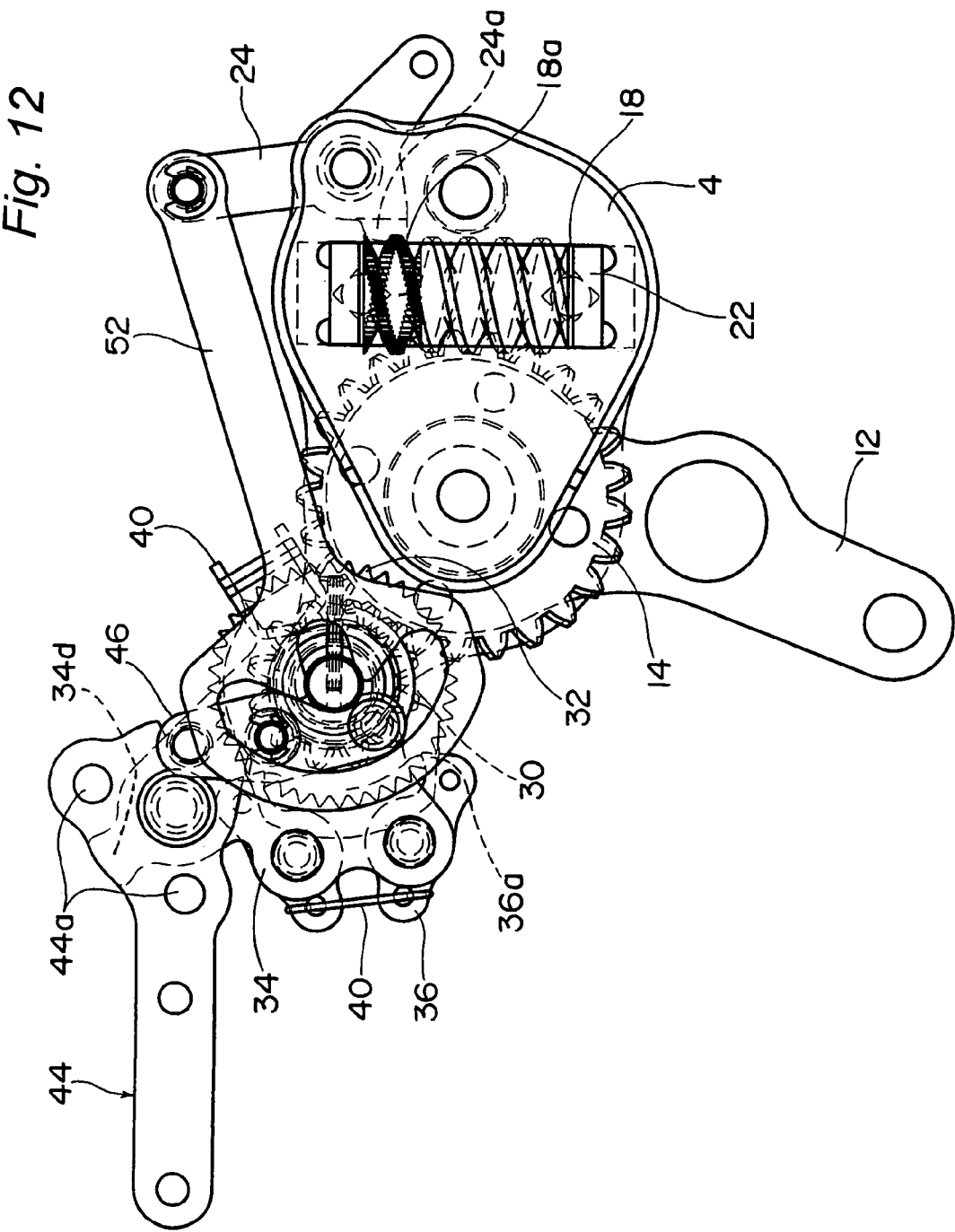
FIG. 12 is a front view of the seat height adjusting device of FIG. 2 when the rear end portion of the seat is in its uppermost position.

FIG. 12 depicts the seat height adjusting device M when the rear end portion of the seat is in its uppermost position. In this condition, the lock portion 24*a* of the lock member 24 engages with one of the notches 18*a* in the worm 18 by the action of the elastic force of the spring, while the claws 36*a* of the pair of latches 36 engage with the spur gear 32 and, hence, the height of the rear end portion of the seat is retained unchanged, as is similar to the condition shown in FIG. 10.

Figure 13:
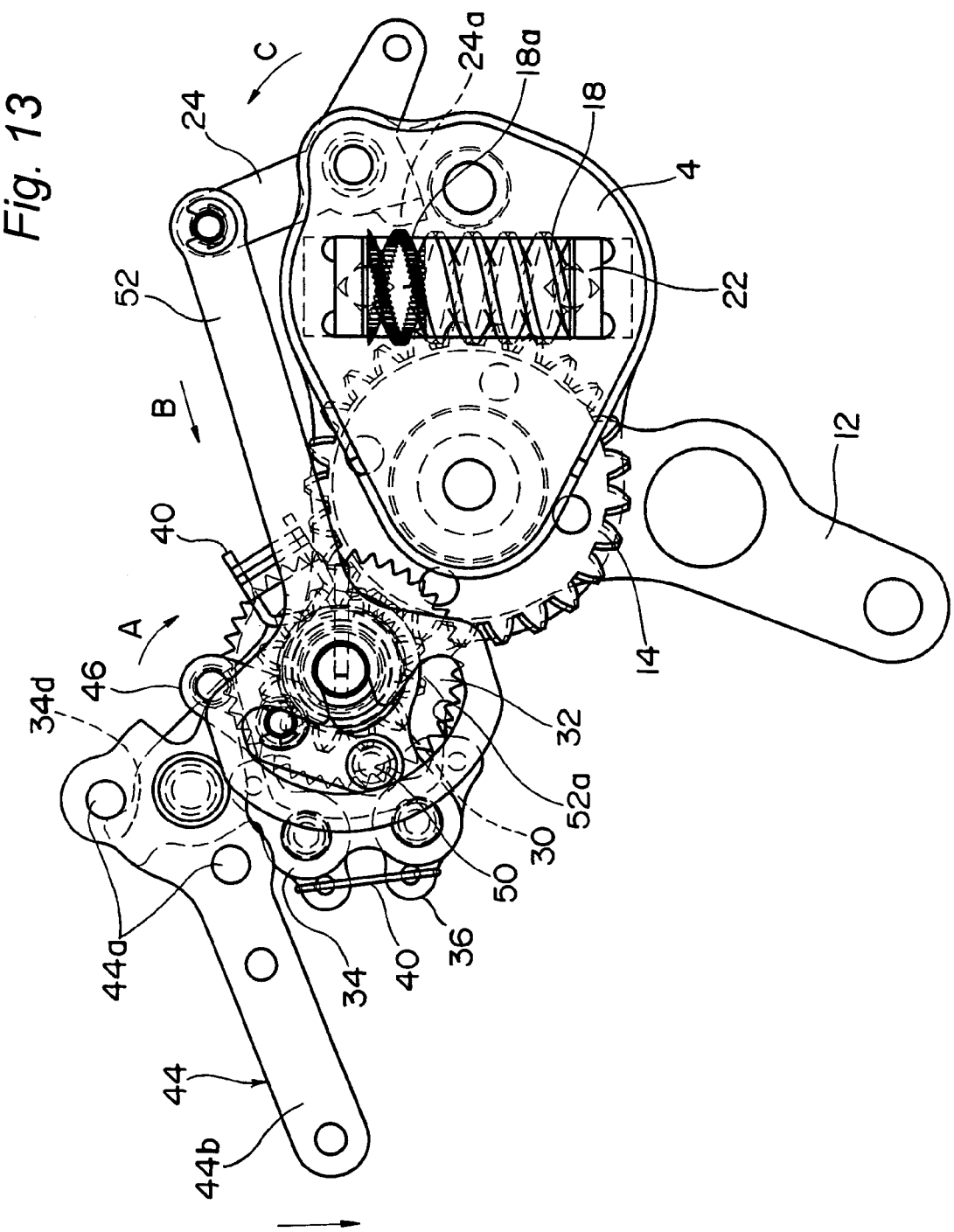
FIG. 13 is a front view of the seat height adjusting device of FIG. 2, particularly depicting an operation to lower the rear end portion of the seat.

In the case where the rear end portion of the seat is lowered, when the grip 44*b* of the handle 44 is lowered to a position as shown in FIG. 13, the kick plate 46 rotates in the direction of the arrow A to thereby cause the pin 50 received in the first guide groove 52*a* in the release 52 to move the release 52 in the direction of the arrow B. As a result, the lock member 24 rotates in the direction of the arrow C, and the engagement between the lock portion 24*a* of the lock member 24 and the notch 18*a* in the worm 18 is released.

Figure 14:
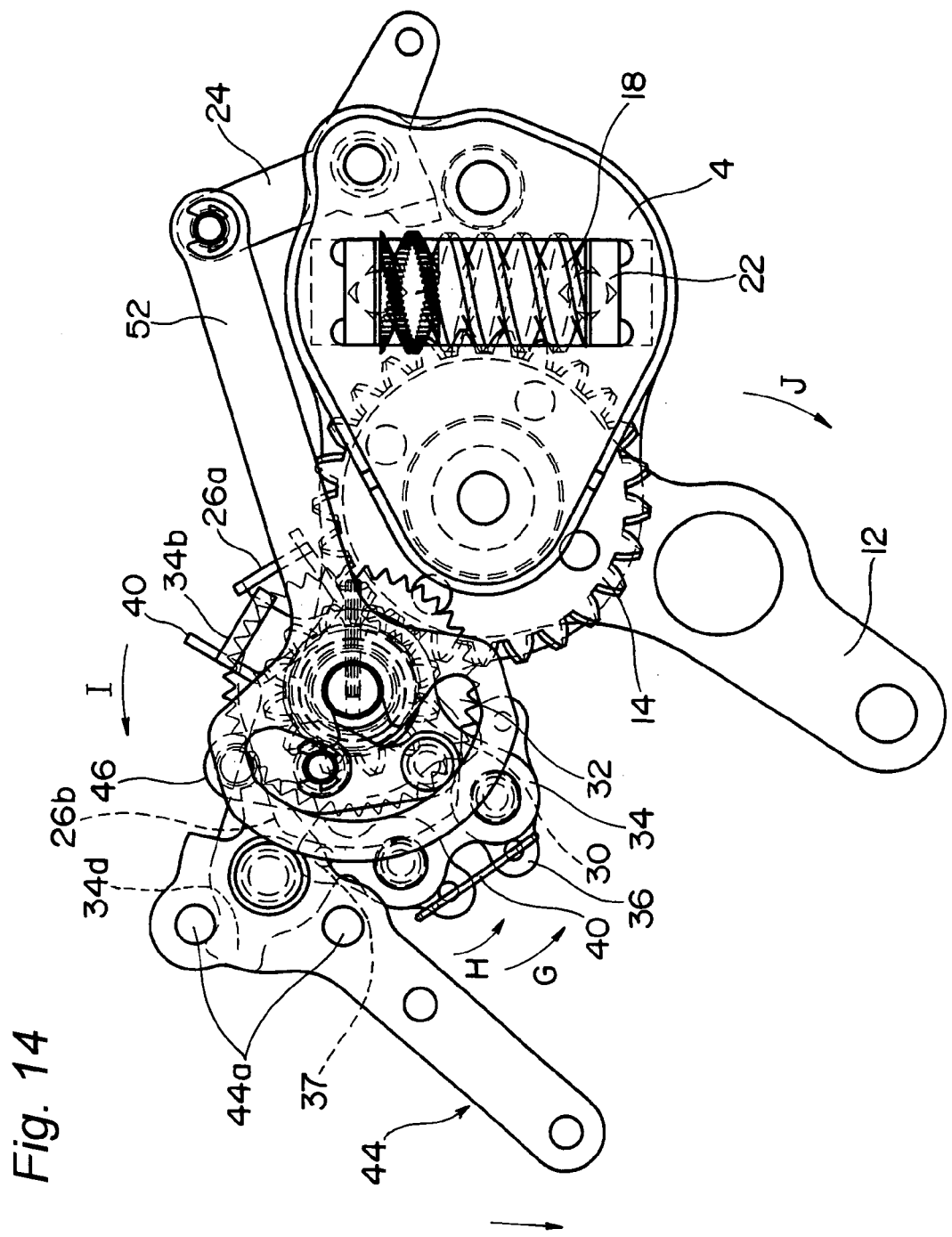
FIG. 14 is a front view of the seat height adjusting device of FIG. 2, particularly depicting another operation to lower the rear end portion of the seat.

In such condition, the protrusion 44*a* remote from the grip 44*b* of the handle 44 is held in contact with a side edge of the protrusion 34*d* of the handle holder 34. Accordingly, when the handle 44 is further lowered from this condition, as shown in FIG. 14, the handle holder 34 rotates within a predetermined range of angle together with the handle 44. Further, the pair of latches 36 rotate in a direction shown by an arrow G (the direction counter to the arrow D) together with the handle holder 34, and the pin 37 secured to the upper latch 36 slides along an outer edge of the stepped portion 26*b* of the third bracket 26, thereby rotating the upper latch 36 in a direction shown by an arrow H. As a result, the engagement between the upper latch 36 and the spur gear 32 is released, but the lower latch 36 is still held in engagement with the spur gear 32 and, hence, the spur gear 32 similarly rotates in a direction shown by an arrow I (the direction counter to the arrow A). Accordingly, the arm 12 is driven to rotate a predetermined angle in a direction shown by an arrow J (the direction counter to the arrow F) via the first and second helical gears 14, 30 held in engagement with each other, thus lowering the rear end portion of the seat by a predetermined height or vertical length corresponding to the aforementioned predetermined angle.

In this condition, when the handle 44 is released, the handle holder 34 returns to the neutral position by the action of the elastic force of the spring 40, and the lock portion 24a of the lock member 24 engages with one of the notches 18a in the worm 18 again by the action of the elastic force of the spring (not shown), thereby locking the worm 18.

It is to be noted here that the lower latch 36 has a configuration symmetric to that of the upper latch 36, and that the claw 36a of the lower latch 36 is so shaped that when it pushes a tooth flank of the spur gear 32 in the direction of the arrow I, the engagement of the claw 36a with the spur gear 32 is maintained, but in a case contrary thereto, the engagement of the claw 36a with the spur gear 32 is released against the elastic force of the spring 40.

Accordingly, when the handle 44 returns to the intermediate position, the spur gear 32 engages with the pair of latches 36 again while maintaining the condition in which the spur gear 32 has rotated the predetermined angle and, hence, the rear end portion of the seat can be further lowered by a predetermined height by lowering the handle 44 again.

That is, by moving the handle 44 up and down between the intermediate position and the lowermost position, the lock member 24 and the worm 18 engage with or disengage from each other, while the lower latch 36 engages intermittently with the spur gear 32, making it possible to lower the rear end portion of the seat down to a desired height.

It is to be noted here that although in the above-described embodiment the seat height adjusting device M according to the present invention has been described as being mounted on a rear end portion of the seat frame S on one side thereof, and explanation has been made of the case where the height of the rear end portion of the seat is arbitrarily adjusted, the seat height adjusting device M according to the present invention may be mounted on a front end portion and a rear end portion of the seat frame S one for each end portion. In this case, not only can the height of the front end portion and that of the rear end portion be arbitrarily adjusted, but the angle of the surface of a seat cushion can be also appropriately changed.

Because the seat height adjusting device according to the present invention employs a mechanical lock without employing a friction lock, the seat stiffness increases and the operational feel improves. Accordingly, the seat height adjusting device according to the present invention can be effectively utilized in an automobile seat.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A seat height adjusting device mounted on at least one of a front end portion and a rear end portion of a seat that has a seat frame and is supported by a seat support, the seat height adjusting device comprising:

a first bracket and a second bracket spaced away from each other, one of the first and second brackets being joined to the seat frame;

an arm disposed between the first and second brackets and having one end pivotally mounted on the first bracket and the other end pivotally mounted on the seat support;

a spur gear operable to rotate the arm;

a first latch and a second latch both engageable with the spur gear; and a handle rotatably mounted on one of the first and second brackets;

wherein when the seat is raised, the handle is operated to intermittently engage the first latch with the spur gear, thereby rotating the spur gear in a first direction to drive the arm;

wherein when the seat is lowered, the handle is operated to intermittently engage the second latch with the spur gear, thereby rotating the spur gear in a second direction counter to the first direction to drive the arm; and wherein a worm is rotatably disposed between the first and second brackets, a first helical gear is secured to the arm and held in engagement with the worm, and a second helical gear is joined to the spur gear and held in engagement with the first helical gear, wherein the arm is driven via the first and second helical gears by rotating the spur gear.

2. The seat height adjusting device according to claim 1, wherein the worm and the first helical gear have a lead angle greater than an angle of friction.

3. The seat height adjusting device according to claim 1, further comprising a lock member, wherein the worm has a number of notches defined therein so as to be engageable with the lock member, the lock member being operable to lock the worm or release the worm from being locked.

4. The seat height adjusting device according to claim 1, wherein one of the first and second brackets has a latch driving portion to drive the first and second latches, and wherein when the spur gear rotates in the first direction, the latch driving portion is operable to release engagement between the second latch and the spur gear, while when the spur gear rotates in the second direction, the latch driving portion is operable to release engagement between the first latch and the spur gear.

5. The seat height adjusting device according to claim 1, further comprising a handle holder on which the handle and the first and second latches are rotatably mounted, wherein the handle is operated to rotate the handle holder within a predetermined range of angle, thereby intermittently engaging the first and second latches with the spur gear.

6. The seat height adjusting device according to claim 5, further comprising a kick plate rotatably mounted on the handle holder, wherein the handle is operated to rotate the lock member via the kick plate, thereby locking the worm or releasing the worm from being locked.

* * * * *